US012799411B2

(12) United States Patent
Fan et al.

(10) Patent No.: US 12,799,411 B2
(45) Date of Patent: Nov. 17, 2026

(54) COMBINED HYDROGENATION PROCESS AND SYSTEM FOR PRODUCING CHEMICAL RAW MATERIALS

(71) Applicants: CHINA PETROLEUM & CHEMICAL CORPORATION, Beijing (CN); SINOPEC DALIAN RESEARCH INSTITUTE OF PETROLEUM AND PETROCHEMICALS CO., LTD., Dalian (CN)

(72) Inventors: Siqiang Fan, Dalian (CN); Zhongyi Wang, Dalian (CN); Ziming Wu, Dalian (CN); Shaozhong Peng, Dalian (CN); Chang Liu, Dalian (CN); Zhengkai Cao, Dalian (CN); Shike Sun, Dalian (CN); Zhe Cui, Dalian (CN)

(73) Assignees: CHINA PETROLEUM & CHEMICAL CORPORATION, Beijing (CN); SINOPEC DALIAN RESEARCH INSTITUTE OF PETROLEUM AND PETROCHEMICALS CO., LTD., Dalian (CN)

( * ) Notice: Subject to any disclaimer, the term of this patent is extended or adjusted under 35 U.S.C. 154(b) by 294 days.

(21) Appl. No.: 18/705,634

(22) PCT Filed: Oct. 14, 2022

(86) PCT No.: PCT/CN2022/125330
§ 371 (c)(1),
(2) Date: Apr. 29, 2024

(87) PCT Pub. No.: WO2023/071827
PCT Pub. Date: May 4, 2023

(65) Prior Publication Data
US 2025/0011664 A1 Jan. 9, 2025

(30) Foreign Application Priority Data
Oct. 30, 2021 (CN) ......................... 202111277050.0

(51) Int. Cl.
*C10G 65/12* (2006.01)
*B01D 3/14* (2006.01)
(Continued)

(52) U.S. Cl.
CPC ............... *C10G 65/12* (2013.01); *B01D 3/14* (2013.01); *B01J 8/0492* (2013.01); *C10G 47/00* (2013.01);
(Continued)

(58) Field of Classification Search
CPC .......... B01D 3/14; B01J 8/0492; C10G 47/00; C10G 65/12; C10G 2300/1037;
(Continued)

(56) References Cited

U.S. PATENT DOCUMENTS

2001/0042699 A1 11/2001 Cash et al.
2018/0002616 A1 * 1/2018 Kumar .................. B01D 3/143
2021/0179953 A1 6/2021 Koseoglu et al.

FOREIGN PATENT DOCUMENTS

CN 100497547 C 6/2009
CN 102453535 A 5/2012
(Continued)

OTHER PUBLICATIONS

Zhu, Heli et al.; "Discussion on Project for Increment of Light Oil Yield on Hydrogenation Cracking Unit"; Qilu Petrochemical Technology; vol. 44, No. 4; 2016; pp. 326-330.

*Primary Examiner* — James C Goloboy
(74) *Attorney, Agent, or Firm* — NKL Law; Allen Xue

(57) ABSTRACT

A combined hydrogenation process and system for producing chemical raw materials are provided. The process has the
(Continued)

following steps: (1) performing a hydrogenation pretreatment reaction on a wax oil raw material and hydrogen-containing gas, mixing the hydrogenated wax oil obtained by means of the reaction and a light diesel oil fraction, and performing a first hydrocracking reaction to obtain a first hydrocracking material flow; (2) separating and fractionating the first hydrocracking material flow to obtain a diesel oil fraction; and (3) performing a second hydrocracking reaction on the diesel oil fraction obtained in step (2) to obtain a second hydrocracking material flow, and separating and fractionating the second hydrocracking material flow. The process can transform all the high aromatics inferior diesel oil raw materials and wax oil raw materials into light naphtha, heavy naphtha tail oil and other high value-added products.

18 Claims, 1 Drawing Sheet

(51) Int. Cl.
*B01J 8/04* (2006.01)
*C10G 47/00* (2006.01)

(52) U.S. Cl.
CPC ................ *C10G 2300/1037* (2013.01); *C10G 2300/1055* (2013.01); *C10G 2300/301* (2013.01); *C10G 2400/04* (2013.01)

(58) Field of Classification Search
CPC ...... C10G 2300/1055; C10G 2300/301; C10G 2400/04
See application file for complete search history.

(56) References Cited

FOREIGN PATENT DOCUMENTS

| | | | | |
|---|---|---|---|---|
| CN | 103059972 | A | * | 4/2013 |
| CN | 103059986 | A | | 4/2013 |
| CN | 103805245 | A | | 5/2014 |
| CN | 105018139 | A | | 11/2015 |
| CN | 108003933 | A | | 5/2018 |
| CN | 109694732 | A | | 4/2019 |
| CN | 109988606 | A | | 7/2019 |
| CN | 109988611 | A | | 7/2019 |
| CN | 109988621 | A | | 7/2019 |
| CN | 109988648 | A | | 7/2019 |
| CN | 112143521 | A | | 12/2020 |
| CN | 112143522 | A | | 12/2020 |
| CN | 112725023 | A | | 4/2021 |
| CN | 112725027 | A | | 4/2021 |
| CN | 113136243 | A | | 7/2021 |
| JP | 2018508624 | A | | 3/2018 |
| RU | 2707965 | C1 | | 12/2019 |

* cited by examiner

COMBINED HYDROGENATION PROCESS AND SYSTEM FOR PRODUCING CHEMICAL RAW MATERIALS

CROSS-REFERENCE TO RELATED APPLICATIONS

This application is a U.S. national stage entry of PCT International Application No. PCT/CN2022/125330; filed on Oct. 14, 2022, which claims benefit of the Chinese patent application No. 202111277050.0 filed on Oct. 30, 2021, the content of which is incorporated herein by reference in its entirety.

TECHNICAL FIELD

The present invention relates to the field of petroleum refining, in particular to a combined hydrogenation process and system for producing chemical raw materials.

BACKGROUND ART

It is reported that the apparent consumption of diesel oil in China will be maintained at about 170 million tons per year within a certain period, and the proportion of diesel oil products in the portfolio of petroleum refining products decreases year by year in contrast to the gradual increase of the crude oil processing amount, thus a part of diesel oil raw materials needs to be transformed into the chemical raw materials. Hydrocracking is a product structure regulator for the oil refining and chemical engineering integrated enterprises, it is also the core of the oil-chemical-fiber complex and can adapt to the rapidly increased demand for basic chemical raw materials (e.g., aromatic hydrocarbons and ethylene) in the domestic market. Many efforts have been made by the refinery enterprises along the direction of producing more chemical raw materials in the hydrocracking units, the heavy naphtha produced from the hydrocracking process has a high potential content of aromatic hydrocarbons, it can be used as a high-quality raw material for the catalytic reforming units to produce BTX; the tail oil products and light naphtha products have a high content of paraffin and a low BMCI value, can be used as a raw material for preparing ethylene by steam cracking. In particular, the two-stage hydrocracking process flow, wherein the diesel oil fraction generated in the first stage is introduced into a second stage hydrocracking reaction area, so that the production of the diesel is zero, in order to fulfill the purpose of producing the chemical raw materials to the maximum extent. However, when the process is implemented, the yield of the tail oil product of high-quality ethylene cracking raw material is relatively low and influenced by a conventional hydrocracking reaction path, once the paraffin-rich tail oil product enters the second stage or is converted into the light fractions, the yield of gas product is increased, which greatly decreases the economic benefit of the device.

Another development trend in the refining and chemical field is to decrease the diesel/gasoline ratio and reduce the production of the diesel. However, the method has a limitation in that each large refining and chemical enterprise is provided with a diesel oil hydrofining device, thus it becomes a problem to be urgently solved by the large refining and chemical enterprises concerning how to realize high added value utilization of diesel oil, especially how to efficiently treat the diesel oil having a high content of aromatic hydrocarbons which can hardly be processed on the basis of reasonably utilizing the existing diesel oil hydrofining plant.

The China patent application CN108003933A discloses a hydrocracking method for producing chemical industry raw materials from diesel oil distillate, the method can produce chemical raw materials from diesel oil distillate under medium-low pressure conditions, wherein the heavy naphtha can be used as reforming raw material with a high potential of aromatic hydrocarbons, both the light naphtha and tail oil can be used as the high-quality raw material of steam cracking. However, the patent application also requires that the chain alkane content in the diesel oil distillate is 20-50%, the method is not suitable for processing inferior diesel oil having a high content of aromatic hydrocarbons, and the product distribution cannot be optimized either. The China patent application CN103059986A discloses a two-stage hydrocracking method, the patent application mainly improves the selectivity and product properties of the heavy naphtha by reducing the activity of the two-stage hydrocracking catalyst. The China patent application CN105018139A discloses a hydrocracking method of low-energy-consumption productive high-quality chemical raw materials, wherein two hydrocracking catalysts are filled in the upstream part and the downstream part of a first hydrocracking reaction device, the content of molecular sieve in the hydrocracking catalyst at the upstream part is 30%-70%, and the content of molecular sieve in the hydrocracking catalyst at the downstream part is 15%-50%, to improve the target product selectivity under the condition of low energy consumption. However, the product distribution structure of obtained chemical raw materials cannot be essentially optimized, and the activity of the two-stage hydrocracking catalysts is reduced due to sulfur loss along with the prolonging of the running time.

SUMMARY OF THE INVENTION

The present invention aims to overcome the defect in the prior art concerning the low yield of tail oil products which can be used as high-quality ethylene cracking raw material in the two-stage hydrocracking process products for producing chemical raw materials to the maximum extent and provides a combined hydrogenation process and system for producing chemical raw materials. The combined hydrogenation process provided by the present invention can improve the long-cycle stability of the two-stage hydrocracking device and the yield of a tail oil product that can be used as the high-quality ethylene cracking raw material.

The inventors of the present invention have discovered in the research process that the yield of the tail oil product which can be used as a high-quality ethylene cracking raw material in the two-stage hydrocracking process product for producing chemical raw materials to the maximum extent is low, the main reason is that the tail oil fraction in the raw material oil is converted into a large amount of diesel oil fractions in the first-stage hydrocracking reactor, and the diesel oil fractions further react to generate light and heavy naphtha products and inevitably consumes more heat and hydrogen gas, so that both the energy consumption and chemical hydrogen consumption of a device are increased, and the operation costs of the device are raised. The raw material to be processed in the second-stage hydrocracking reactor is the diesel oil fraction obtained from the primary hydrocracking, wherein the diesel oil fraction has a high content of long-chain components, such that the cracking degree cannot be easily controlled, an increase of the gas product results in the decreased yield of liquid products, in addition, the second-stage hydrocracking catalyst is inactivated due to low sulfur content in the reactants.

In order to solve the defect in the prior art, the first aspect of the present invention provides a combined hydrogenation process for producing chemical raw materials, the process comprises the following steps:

(1) performing a hydrogenation pretreatment reaction on a wax oil raw material and hydrogen-containing gas, mixing the hydrogenated wax oil obtained by means of the reaction with a light diesel oil fraction, and performing a first hydrocracking reaction to obtain a first hydrocracking material flow;

(2) separating and fractionating the first hydrocracking material flow to obtain a diesel oil fraction;

(3) performing a second hydrocracking reaction on the diesel oil fraction obtained in step (2) to obtain a second hydrocracking material flow, and separating and fractionating the second hydrocracking material flow.

Preferably, the light diesel oil fraction has an initial boiling point within the range of 150-250° C., preferably within the range of 180-220° C., and a final distillation point within the range of 280-360° C., preferably within the range of 300-340° C.

Preferably, in step (3), the diesel oil fraction obtained in step (2) is mixed with the heavy diesel oil fraction obtained by cutting the inferior diesel oil, and the second hydrocracking reaction is then performed.

Preferably, the method further comprises: cutting the second hydrocracking material flow to obtain a light cycle oil and a heavy cycle oil, the light cycle oil back to step (2) for performing the separating process, and the heavy cycle oil back to step (1) for performing the hydrogenation pretreatment reaction.

A second aspect of the present invention provides a combined hydrogenation system for producing chemical raw materials, the system comprises the following components:

a wax oil raw material supply unit, a hydrocracking pretreatment reaction unit, a first hydrocracking reaction unit, a gas-liquid separation unit, a fractionating unit, and a second hydrocracking reaction unit which are sequentially connected;

wherein an outlet of the wax oil raw material supply unit connects with an inlet of the hydrocracking pretreatment reaction unit for providing the wax oil raw material to the hydrocracking pretreatment reaction unit;

wherein the gas-liquid separation unit is provided with a gas-phase material flow outlet and a liquid-phase material flow outlet, and the liquid-phase material flow outlet of the gas-liquid separation unit is connected with an inlet of the fractionating unit;

wherein the fractionating unit is provided with a diesel oil fraction outlet connected with an inlet of the second hydrocracking reaction unit;

the system further comprises a light diesel oil fraction supply unit, an outlet of the light diesel oil fraction supply unit connects with an inlet of the first hydrocracking reaction unit for providing a light diesel oil fraction to the first hydrocracking reaction unit.

Compared with the prior art, the combined hydrogenation process and system for producing chemical raw materials provided by the present invention have the following advantages and characteristics:

(1) The present inventors find in the research process that the hydrocracking reaction has a dynamic inhibition orientation phenomenon in a cracking reaction area, namely "during the hydrocracking process of the full-fraction reactant, an introduction of the substance having a distillation ranges from A° C. to B° C. will promote the reaction of the substance with the distillation range of less than B° C., and inhibit reaction of the substance reaction with the distillation range of more than B° C.". Based on the phenomenon, the inventors improve the selectivity of the target products by optimizing the hydrocracking reaction path. Specifically in the present invention, a light diesel oil fraction (preferably, the light diesel oil fraction is obtained from separating the hydrogenated diesel oil produced after hydrofining an inferior diesel oil raw material) is introduced into a first hydrocracking reaction, and a dynamic inhibition orientation phenomenon existing in the hydrocracking reaction is utilized, so that the concentration of the light diesel oil fraction in the first hydrocracking reaction unit is greatly increased, which inhibits the conversion from the heavy fraction to the light diesel oil fraction, so that the tail oil yield is increased, and the light diesel oil fraction is efficiently converted into light naphtha and heavy naphtha. Preferably, a heavy diesel oil fraction obtained from the separation of the hydrogenated diesel oil produced by hydrofining the inferior diesel oil raw material is introduced into a second hydrocracking reaction, and the concentration of heavy diesel oil fraction in the second hydrocracking reaction unit is substantially increased, and from the perspective of ingredients, the increased content of aromatic hydrocarbons is further hydrogenated to inhibit the generation of the gas product, such that the device realizes high-efficiency conversion at the lower reaction temperature, the yield of a tail oil product which can be used as ethylene cracking raw material can be increased, and a gas product yield of the device is decreased.

(2) The present invention realizes highly economic hydrogenation and conversion of the inferior diesel oil raw material having a high content of aromatic hydrocarbons by arranging a reasonable reaction path. Due to the arrangement of combined use, the severity of requirements on the product quality of the diesel oil hydrofining unit is reduced, which brings forth a series of technical advantages: on one hand, more favorable thermodynamic conditions are provided for the aromatic hydrocarbon saturation and other reaction of the inferior diesel oil having a high content of aromatic hydrocarbons by decreasing the reaction temperature of the diesel hydrocarbon reaction unit. And under the preferable condition, the heavy cycle oil obtained after separating the reaction product of the second hydrocracking reaction unit is introduced into the hydrocracking pretreatment reaction unit, to avoid the circumstance in the prior art that the selectivity of the second-stage hydrocracking is deteriorated due to accumulation of aromatic hydrocarbons in the cycle oil of the conventional second-stage hydrocracking process.

(3) The process provided by the present invention can convert the inferior diesel oil raw materials with a high content of aromatic hydrocarbons and the wax oil raw materials into high value-added products such as light naphtha, heavy naphtha, and tail oil, thereby reducing the diesel/gasoline ratio to zero in a true sense. Meanwhile, the aromatic hydrocarbons in the inferior diesel oil raw materials with a high content of aromatic hydrocarbons are efficiently retained in the heavy naphtha fraction, so that the potential content of aromatic hydrocarbons in the product heavy naphtha is obviously increased compared with the potential content of aromatic hydrocarbons in the heavy naphtha product in the conventional two-stage hydrocracking process.

(4) Preferably, in the present invention, the oil generated from the refining of heavy diesel oil after refining the inferior diesel oil with a high content of aromatic hydrocarbons is preferably introduced into the second hydrocracking reaction unit, and its sulfur content is within the range of 100-2,500 ppm, so that the effect of sulfur supplementation on the hydrocracking catalyst in the second hydrocracking reaction unit is achieved without affecting the product properties of the second hydrocracking reaction unit. The method solves the problems that the sulfur content in the raw material of the second hydrocracking reaction unit is low, and the catalyst is subjected to sulfur loss along with the reaction process, and further solves the problem concerning the reduced conversion rate resulting from the activity of the catalyst is gradually reduced during the hydrocracking reaction process due to the sulfur loss.

DESCRIPTION OF REFERENCE SIGNS

Figure 1:
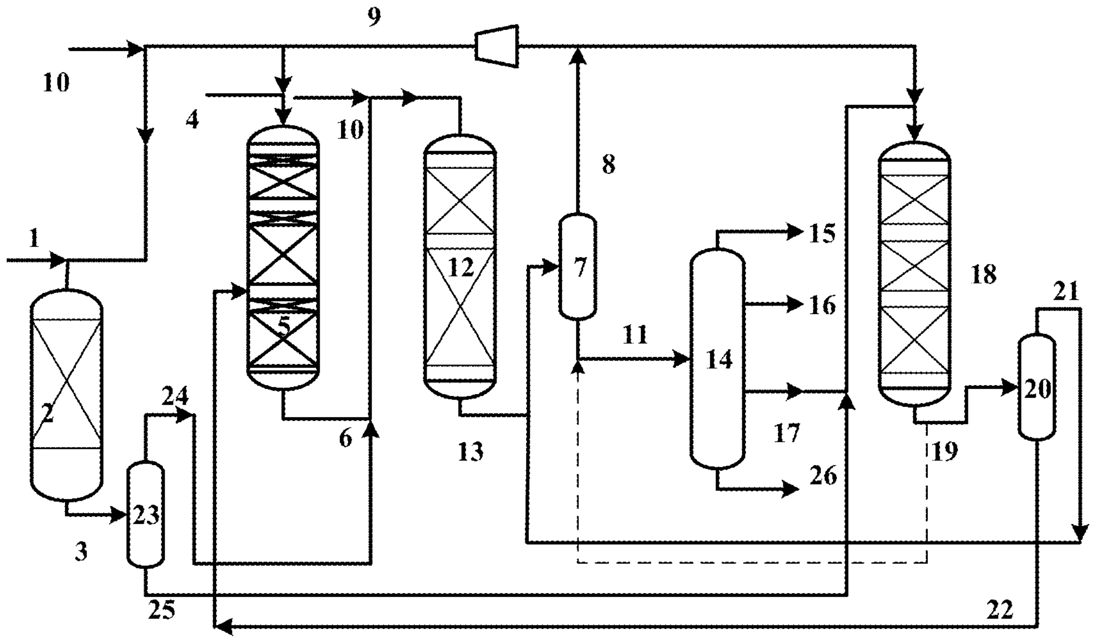
FIG. 1 is a schematic diagram of a combined hydrogenation process and system for producing chemical raw materials according to a specific embodiment of the present invention.

As shown in FIG. 1, 1—inferior diesel oil; 2—hydrofining reaction unit; 3—hydrogenated diesel oil; 4—wax oil raw material; 5—hydrocracking pretreatment reaction unit; 6—hydrogenated wax oil; 7—gas-liquid separation unit; 8—gas-phase material flow; 9—recycle hydrogen; 10—new hydrogen; 11—liquid-phase material flow; 12—first hydrocracking reaction unit; 13—first hydrocracking material flow; 14—fractionation unit; 15—gas; 16—naphtha fraction; 17—diesel oil fraction; 18—second hydrocracking reaction unit; 19—second hydrocracking material flow; 20—second cutting unit; 21—light cycle oil; 22—heavy cycle oil; 23—first cutting unit; 24—light diesel oil fraction; 25—heavy diesel oil fraction; 26—tail oil fraction.

Figure 2:
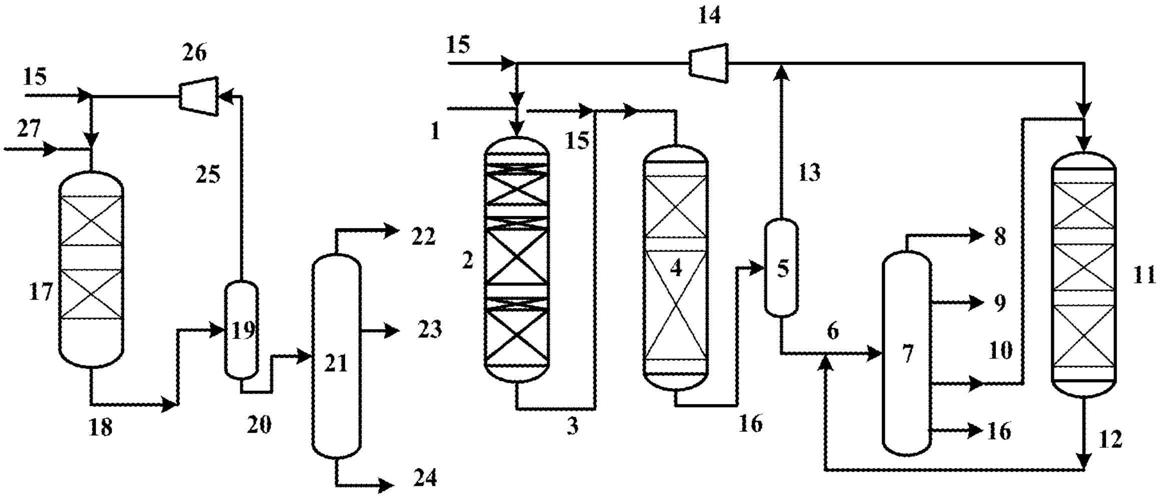
FIG. 2 illustrates a schematic diagram of a conventional two-stage wax oil hydrocracking and diesel oil hydrofining combined process flow.

As shown in FIG. 2, 1—wax oil raw material; 2—hydrocracking pretreatment reaction area; 3—pretreatment reaction product; 4—first hydrocracking reaction area; 5—wax oil gas-liquid separator; 6—liquid-phase material; 7—wax oil fractionating tower; 8—first gas; 9—first naphtha; 10—unconverted oil; 11—second hydrocracking reaction area; 12—second-stage hydrocracking product; 13—gas-phase material; 14—recycle hydrogen compressor; 15—new hydrogen; 16—first hydrocracking reaction product; 17—diesel oil hydrofining reactor; 18—diesel oil hydrofining reaction product; 19—diesel oil gas-liquid separator; 20—liquid-phase material flow; 21—diesel oil fractionating tower; 22—second gaseous product; 23—second naphtha; 24—refined diesel oil; 25—gas-phase material flow; 26—recycle hydrogen compressor; 27—diesel oil raw material.

DESCRIPTION OF THE PREFERRED EMBODIMENT

The terminals and any value of the ranges disclosed herein are not limited to the precise ranges or values, such ranges or values shall be comprehended as comprising the values adjacent to the ranges or values. As for numerical ranges, the endpoint values of the various ranges, the endpoint values and the individual point value of the various ranges, and the individual point values may be combined with one another to produce one or more new numerical ranges, which should be deemed have been specifically disclosed herein.

The description of the exemplary embodiments aims to facilitate comprehension of the present disclosure with reference to the accompanying drawings, which are considered to be a part of the entire written description. In the description, the relative terms such as "lower," "upper", "horizontal", "vertical", "above", "below", "upward", "downward", "top" and "bottom" as well as derivatives thereof (e.g., "horizontally", "downwardly", "upwardly") should be construed to refer to the orientation as then described in the accompanying drawings. These relative terms serve to facilitate the description and do not require that the apparatus be constructed or operated in a particular orientation. Unless otherwise specified in the present invention, the term "connect" used herein refer to a relationship, wherein structures are secured or coupled with each other either directly or indirectly through an intermediate structure.

In the first aspect, the present invention provides a combined hydrogenation process for producing chemical raw materials, the process comprises the following steps:

(1) performing a hydrogenation pretreatment reaction on a wax oil raw material and hydrogen-containing gas, mixing the hydrogenated wax oil obtained by means of the reaction with a light diesel oil fraction, and performing a first hydrocracking reaction to obtain a first hydrocracking material flow;

(2) separating and fractionating the first hydrocracking material flow to obtain a diesel oil fraction;

(3) performing a second hydrocracking reaction on the diesel oil fraction obtained in step (2) to obtain a second hydrocracking material flow.

The process provided by the present invention introduces the light diesel oil fraction into the first hydrocracking reaction, utilizes the dynamic inhibition orientation phenomenon existing in the hydrocracking reaction to greatly increase the concentration of the light diesel oil fraction in the first hydrocracking reaction unit, inhibits conversion of the heavy fraction into the light diesel oil fraction to improve the yield of tail oil, and promotes the efficient conversion of the light diesel oil fraction into light naphtha and heavy naphtha.

Light diesel oil fraction, as long as it achieves the above purposes, applies to the present invention, and its specific composition, source and used amount can be selected from a wide range. Preferably, the light diesel oil fraction has an initial boiling point within the range of 150-250° C., preferably within the range of 180-220° C.; a final distillation point within the range of 280-360° C., preferably within the range of 300-340° C. A use of the preferred embodiment is more conducive to enhancing the dynamic inhibition orientation effect.

Preferably, the mass ratio of the hydrogenated wax oil to the light diesel oil fraction is 1-50:1, more preferably 15-20:1. A use of the preferred embodiment is more conducive to enhancing the dynamic inhibition orientation effect.

Preferably, the light diesel oil fraction is obtained by cutting an inferior diesel oil. The present invention does not impose a particular limitation to the cutting mode, for example, a fractionating tower, specifically a plate fractionating tower, may be used.

Preferably, a cutting temperature of the light diesel oil fraction and the heavy diesel oil fraction are within the range of 280° C.-360° C., preferably within the range of 300° C.-340° C.

Preferably, the process further comprises: subjecting the inferior diesel oil and the hydrogen-containing gas to the desulfurization, denitrification and aromatic hydrocarbon saturation reaction to obtain a hydrogenated diesel oil, and then carrying out the cutting.

According to a preferred embodiment of the present invention, the inferior diesel oil has a distillation range of 150° C.-420° C., preferably 160° C.-360° C., and an aromatic hydrocarbon content within the range of 20 wt %-90 wt %, preferably within the range of 55 wt %-85 wt %. The present invention does not impose special requirements on the sulfur and nitrogen content in the inferior diesel oil, the sulfur content is not more than 2.2 wt % and the nitrogen content is not more than 3,000 mg/kg in general condition.

The present invention has a wide selection range regarding the source of the inferior diesel oil, and preferably, the inferior diesel oil is at least one selected from the group consisting of catalytically cracked diesel oil, coker diesel oil, and heavy aromatic hydrocarbon oil. The catalytically cracked diesel oil, coker diesel oil, and heavy aromatic hydrocarbon oil have conventional definitions in the art.

In the present invention, the inferior diesel oil may mix with hydrogen gas and then enter the hydrofining reaction unit for performing the desulfurization, denitrification and aromatic hydrocarbon saturation reaction.

Preferably, the desulfurization, denitrification and aromatic hydrocarbon saturation reaction conditions include: a reaction temperature is within the range of 300-410° C., more preferably within the range of 320-390° C.; a reaction pressure is within the range of 3-20 MPa, more preferably within the range of 4-12 MPa; a volume space velocity is within the range of 0.2-19 $h^{-1}$, more preferably within the range of 0.6-3.5 $h^{-1}$; a volume ratio of hydrogen/oil is within the range of 100-2,500, more preferably within the range of 1,000-1,800.

Understandably, the desulfurization, denitrification and aromatic hydrocarbon saturation reaction is carried out in the presence of a hydrofining catalyst. Specifically, the hydrofining reaction unit comprises at least one hydrogenation reactor, and at least one hydrofining catalyst is filled in the hydrogenation reactor. Generally, a hydrofining catalyst comprises a hydrogenation active metal component and a carrier. The hydrogenation active metal component may be one or more selected from the group consisting of metal elements in Group VI, Group VII, and Group VIII, preferably two or more hydrogenation active metal components selected from the group consisting of Co, Mo, Ni, and W; the carrier may be inorganic refractory oxide such as alumina and silica. The hydrofining catalyst used in the present invention may be commercially available or be prepared according to the common knowledge in the art as required. Specifically, the hydrofining catalyst may be selected from the commercially available diesel oil hydrofining catalysts FHUDS-3, FHUDS-6, FHUDS-7, FHUDS-8, FF-46, FF-66 developed by the Fushun Research Institute of Petroleum and Petrochemicals (FRIPP) of the China Petroleum & Chemical Corporation (Sinopec).

According to the present invention, it is preferred that the distillation range of the wax oil raw material is within the range of 300° C.-600° C. The present invention has no special requirements on the sulfur and nitrogen content and composition. Preferably, the wax oil raw material is at least one selected from the group consisting of an atmospheric wax oil, a vacuum gas oil, a deep drawing wax oil, and an ebullated bed wax oil.

It shall be noted that the oil product distillation range in the present invention refers to the distillation range being within the limited range, for example, the distillation range of the wax oil raw material is within the range of 300° C.-600° C., as long as the distillation range is ensured to be within the range of 300° C.-600° C., for example, the distillation range may be 400° C.-500° C., 300° C.-500° C. or 400° C.-600° C.

The hydrogen-containing gas in step (1) of the present invention refers to a gas capable of providing hydrogen gas, which may be fresh hydrogen gas, recycle hydrogen, or hydrogen-rich gas. Those skilled in the art can clearly comprehend the hydrogen-containing gas after understanding the technical solution of the present invention.

The present invention can mix the wax oil raw material and the hydrogen-containing gas and then enter the hydrogenation pretreatment reaction unit to carry out the hydrogenation pretreatment reaction. The hydrogenation pretreatment reaction is used for removing sulfur and nitrogen impurities in the raw materials and providing an optimal reaction environment for hydrocracking catalysis, the reaction conditions are not particularly limited, and the reaction can be performed according to the conventional conditions in the field.

Preferably, the conditions of the hydrogenation pretreatment reaction in step (1) comprise: a reaction temperature is within the range of 310-420° C., more preferably within the range of 340-400° C.; a reaction pressure is within the range of 6-21 MPa, more preferably within the range of 12-20 MPa; a volume space velocity is within the range of 0.2-8.0 $h^{-1}$, more preferably within the range of 0.5-2.8 $h^{-1}$; a volume ratio of hydrogen/oil is within the range of 800-1,800, more preferably 1,200-1,800.

Specifically, the hydrocracking pretreatment may be performed in a hydrocracking pretreatment reaction unit. The hydrocracking pretreatment unit is provided with at least one hydrogenation reactor, and the hydrogenation reactor contains at least one hydrocracking pretreatment catalyst, preferably containing 2-4 hydrocracking pretreatment catalysts. Generally, the hydrocracking pretreatment catalyst comprises a carrier and a hydrogenation metal component loaded on the carrier, wherein the hydrogenation metal component may be at least one selected from the group consisting of metal elements in Group VI, Group VII, and Group VIII, and preferably two or more active metal components selected from the group consisting of Co, Mo, Ni and W. The kind of the carrier is not particularly limited, the carrier may be conventionally selected in the art. The catalyst can be selected from the commercially available catalysts, such as FF-33, FF-34, FF-46, FF-56, FF-66, FTX, and other commercially available hydrocracking pretreatment catalysts developed by the Fushun Research Institute of Petroleum and Petrochemicals (FRIPP) of the Sinopec, or the catalyst used in the present invention may be prepared according to the common knowledge in the art as required.

The first hydrocracking reaction conditions may be the conventional operation conditions, and preferably, the conditions of the first hydrocracking reaction in step (1) comprise: a reaction pressure is within the range of 7-20 MPa, more preferably within the range of 10-17 MPa; an average reaction temperature is within the range of 320-420° C., more preferably within the range of 340-400° C.; a volume space velocity is within the range of 0.1-5 $h^{-1}$, more preferably within the range of 0.5-2.5 $h^{-1}$; a volume ratio of hydrogen/oil is within the range of 400-1,800, more preferably within the range of 1,200-1,600.

According to a specific embodiment of the present invention, the first hydrocracking reaction may be performed in a first hydrocracking reaction unit, the first hydrocracking reaction unit is provided with at least one hydrocracking reactor, and the hydrocracking reactor contains at least one kind of a first hydrocracking catalyst. The first hydrocracking catalyst is not particularly limited in the present invention, it may be a conventional hydrocracking catalyst in the art; preferably, the first hydrocracking catalyst comprises a hydrogenation component and a carrier, wherein the hydrogenation component is preferably one or more metal elements in Group VI, Group VII, and Group VIII, and further preferably two or more selected from the group consisting of Co, Mo, Ni, and W. The carrier preferably comprises at least one selected from the group consisting of a Y molecular sieve, β molecular sieve, modified Y molecular sieve, modified β molecular sieve, alumina, and amorphous silicon-aluminum. Preferably, the content of the hydrogenation component calculated in terms of oxide is 15-45% and the content of the carrier is 55-85%, based on the weight of the first hydrocracking catalyst. Preferably, the first hydrocracking catalyst contains β molecular sieve, the weight content of β molecular sieve is preferably within the range of 2-35%, more preferably within the range of 5-15%. The first hydrocracking catalyst of the present invention may be selected from commercially available hydrocracking catalysts FC-32A, FC-60, and FC-28 developed by the Fushun Research Institute of Petroleum and Petrochemicals (FRIPP) of the Sinopec, and can also be prepared according to the common knowledge in the art as required, and the present invention does not impose limitation thereto.

According to a preferred embodiment of the present invention, the separating process in step (2) is a gas-liquid separation, in order to obtain a gas-phase material flow and a liquid-phase material flow.

In the present invention, the gas-liquid separation conditions are not particularly limited, and preferably, a gas-liquid separation temperature is within the range of 30-60° C., and a pressure is within the range of 10-16 MPa.

According to a preferred embodiment of the present invention, the separating and fractionating of step (2) comprise: carrying out a gas-liquid separation on the first hydrocracking material flow to obtain a gas-phase material flow and a liquid-phase material flow, and fractionating the liquid-phase material flow to obtain a gas, a naphtha fraction, a diesel oil fraction and a tail oil fraction.

According to the present invention, the fractionating may be carried out in a hydrocracking fractionating tower.

The fractionating conditions in the present invention are not particularly limited in the present invention, as long as the above-mentioned product is obtained. For example, the different hydrocracked products may be obtained by fractionation, the initial boiling point of the naphtha fraction may be within the range of 20° C.-34° C., the cutting temperature between the naphtha fraction and the diesel oil fraction may be within the range of 130° C.-180° C., the cutting temperature between the diesel oil fraction and the tail oil fraction (i.e., the initial boiling point of the tail oil fraction) may be within the range of 320° C.-360° C.

Preferably, the diesel oil fraction of step (2) has a distillation range of 150° C.-350° C.

Preferably, in the combined hydrogenation process, a gas-phase material flow obtained by gas-liquid separation of the first hydrocracking material flow of the first hydrocracking reaction can be recycled after purification treatment. Specifically, the gas-phase material flow may be subjected to the purification treatment and then compressed by a recycle hydrogen compressor to obtain recycle hydrogen. The recycle hydrogen of the present invention can be used for providing hydrogen gas for each unit in the process, for example, the recycle hydrogen can be used in the hydrogenation pretreatment reaction, the first hydrocracking reaction, and the second hydrocracking reaction, and can also be used for providing hydrogen gas required by the desulfurization, denitrification, and aromatic hydrocarbon saturation reaction of the inferior diesel oil.

According to the present invention, the purification treatment may be implemented according to conventional technical means in the art, wherein the general purification treatment includes the removal of hydrogen sulfide in the gas-phase material flow, and the specific purification treatment process may be any one of the existing processes capable of removing hydrogen sulfide.

According to a preferred embodiment of the present invention, in step (3), the diesel oil fraction obtained in step (2) is mixed with the heavy diesel oil fraction obtained from cutting the inferior diesel oil (preferably subject to the hydrofining), and the second hydrocracking reaction is then performed. By adopting the preferred embodiment, the concentration of heavy diesel oil fraction in the second hydrocracking reaction unit is greatly increased, and from the perspective of ingredients, the increased content of aromatic hydrocarbons is further hydrogenated to inhibit the generation of the gas product, such that the device realizes high-efficiency conversion at the lower reaction temperature, the yield of a tail oil product which can be used as ethylene cracking raw material may be increased, and a gas product yield of the device is decreased. In addition, the oil generated from refining heavy diesel oil after refining the inferior diesel oil with a high content of aromatic hydrocarbons is introduced into the second hydrocracking reaction, and its sulfur content is within the range of 100-2,500 ppm, such that the effect of sulfur supplementation on the hydrocracking catalyst in the second hydrocracking reaction unit is achieved without affecting the product properties of the second hydrocracking reaction. Because the sulfur content of the raw material processed in the second stage of the conventional two-stage hydrocracking process is extremely low, the catalyst in a sulfide state is prone to be reduced to an oxidation state for a long time, the supplemented heavy diesel oil fraction can desirably replenish the sulfur, and the sulfur in the heavy diesel oil can be easily removed due to the light weight property of the original raw material in the second stage, thus the process solves the problems that the sulfur content in the raw material of the second hydrocracking reaction unit is low, and the catalyst is subjected to sulfur loss along with the reaction process, and further solves the problem concerning the reduced conversion rate resulting from that the activity of the catalyst is gradually reduced in the hydrocracking reaction process due to the sulfur loss.

According to the present invention, preferably, the heavy diesel oil fraction has an initial boiling point within the range of 280-360° C., more preferably within the range of 300-

340° C.; a final distillation point within the range of 350-400° C., more preferably within the range of 360-380° C.

Preferably, the mass ratio of the diesel oil fraction obtained in step (2) to the heavy diesel oil fraction is 1-30:1, more preferably 20-25:1. The adoption of the preferred embodiment is more beneficial to improving the potential content of aromatic hydrocarbons in the heavy naphtha and the operational stability of the device.

According to a preferred embodiment of the present invention, the second hydrocracking reaction conditions comprise: a reaction pressure is within the range of 7-20 MPa, preferably within the range of 12-17 MPa; an average reaction temperature is within the range of 300-410° C., preferably within the range of 320-390° C.; a volume space velocity is within the range of 0.3-8.0 $h^{-1}$, preferably within the range of 0.6-2.5 $h^{-1}$; a volume ratio of hydrogen/oil is within the range of 700-2,100, preferably within the range of 1,200-1,600.

According to a specific embodiment of the present invention, the second hydrocracking reaction may be performed in a second hydrocracking reaction unit, the second hydrocracking reaction unit is provided with at least one hydrocracking reactor, and the hydrocracking reactor contains at least one kind of the second hydrocracking catalyst.

In the present invention, the first hydrocracking catalyst and the second hydrocracking catalyst may be the same or different, and the present invention is not particularly limited thereto.

Preferably, the second hydrocracking catalyst comprises a hydrogenation component and a carrier, wherein the hydrogenation component is generally one or more metal elements in Group VI, Group VII, and Group VIII, and preferably two or more selected from the group consisting of Co, Mo, Ni, and W. The carrier preferably comprises at least one selected from the group consisting of R molecular sieve, modified β molecular sieve, alumina, and amorphous silica-alumina. Preferably, the content of the hydrogenation component calculated in terms of oxide is 18-40% and the content of the carrier is 60-82%, based on the weight of the second hydrocracking catalyst. Preferably, the second hydrocracking catalyst contains β molecular sieve, the weight content of β molecular sieve is preferably within the range of 5-55%, more preferably within the range of 8-18%. The second hydrocracking catalyst of the present invention may be selected from commercially available hydrocracking catalysts FC-14, FC-24, FC-86, and FC-32 developed by the Fushun Research Institute of Petroleum and Petrochemicals (FRIPP) of the Sinopec, and can also be prepared according to the common knowledge in the art as required, and the present invention does not impose limitation thereto.

In the present invention, the separating and fractionating of the second hydrocracking material flow obtained in step (3) may be performed separately, the separating and fractionating of the second hydrocracking material flow may be performed by combining with step (2). According to a preferred embodiment of the present invention, the second hydrocracking material flow obtained in step (3) is mixed with the first hydrocracking material flow and then jointly subjected to the fractionating.

According to a preferred embodiment of the present invention, the method further comprises: cutting the second hydrocracking material flow to obtain a light cycle oil and a heavy cycle oil, the light cycle oil back to step (2) for performing the separating process (preferably the gas-liquid separation), and the heavy cycle oil back to step (1) for performing the hydrogenation pretreatment reaction. The adoption of the preferred embodiment is more beneficial to the long cycle operation of the device and solves the technical bottleneck of the excessively high content of aromatic hydrocarbons in the second-stage cycle oil.

Preferably, the heavy cycle oil enters the reactor through a feed inlet at the middle and lower part of a reactor shell adopted by the hydrocracking pretreatment reaction, and the volume of the reactor at the lower part of the feed inlet accounts for 10-80%, more preferably 12-20% of the total volume of the reactor. A use of the preferred embodiment is more conducive to improving the potential content of aromatic hydrocarbons in the heavy naphtha product.

Preferably, a cutting temperature of the light cycle oil and the heavy cycle oil is within the range of 10-350° C., more preferably within the range of 120-200° C.

According to a particularly preferred embodiment of the present invention, the present invention provides a combined hydrogenation process for producing chemical raw materials in a maximum extent, the combined hydrogenation process comprises the following content:

(1) mixing the inferior diesel oil raw material with hydrogen gas, and then introducing the mixture into a hydrofining reaction unit for performing the desulfurization, denitrification, and aromatic hydrocarbon saturation reaction to obtain a hydrogenated diesel oil after the reaction;

(2) further cutting the hydrogenated diesel oil obtained in step (1) to obtain a light diesel oil fraction and a heavy diesel oil fraction;

(3) blending the wax oil raw material with hydrogen gas, then entering a hydrocracking pretreatment reaction unit for performing a reaction, mixing the hydrogenated wax oil obtained after the reaction with the light diesel oil fraction obtained in step (2), and then introducing the mixture into a first hydrocracking reaction unit for performing a reaction;

(4) subjecting the reaction products of the first hydrocracking reaction unit to a gas-liquid separation, subsequently separating the obtained liquid-phase material flow to obtain a gas, a naphtha fraction, a diesel oil fraction, and a tail oil fraction;

(5) introducing the diesel oil fraction obtained in step (4) and the heavy diesel oil fraction obtained in step (2) into a second hydrocracking reaction unit and performing a reaction under the condition with the presence of hydrogen gas, and treating the reaction products of the second hydrocracking reaction unit and the reaction products of the first hydrocracking reaction unit jointly.

In a second aspect, the present invention provides a combined hydrogenation system for producing chemical raw materials, as shown in FIG. 1, the system comprises the following components:

a wax oil raw material supply unit, a hydrocracking pretreatment reaction unit, a first hydrocracking reaction unit, a gas-liquid separation unit, a fractionating unit, and a second hydrocracking reaction unit which are sequentially connected;

wherein an outlet of the wax oil raw material supply unit connects with an inlet of the hydrocracking pretreatment reaction unit for providing the wax oil raw material to the hydrocracking pretreatment reaction unit;

wherein the gas-liquid separation unit is provided with a gas-phase material flow outlet and a liquid-phase material flow outlet, and the liquid-phase material flow outlet of the gas-liquid separation unit is connected with an inlet of the fractionating unit;

wherein the fractionating unit is provided with a diesel oil fraction outlet connected with an inlet of the second hydrocracking reaction unit;

the system further comprises a light diesel oil fraction supply unit, an outlet of the light diesel oil fraction supply unit connects with an inlet of the first hydrocracking reaction unit for providing a light diesel oil fraction to the first hydrocracking reaction unit.

Specifically, the hydrocracking pretreatment reaction unit is used for receiving the wax oil raw material and hydrogen gas and obtaining a hydrogenated wax oil after the reaction. In particular, the first hydrocracking reaction unit is used for receiving hydrogen gas, a hydrogenated wax oil obtained after the reaction of the hydrocracking pretreatment reaction unit, a light diesel oil fraction supplied by the light diesel oil fraction supply unit, and a first hydrocracking material flow obtained after the reaction. Specifically, the gas-liquid separation unit is used for receiving and separating the first hydrocracking material flow obtained from the first hydrocracking reaction unit, a gas-phase material flow, and a liquid-phase material flow obtained after the gas-liquid separation. Concretely, the fractionating unit is used for receiving, fractionating, and treating a liquid-phase material flow from the gas-liquid separation unit, and obtaining a gas, a naphtha fraction, a diesel oil fraction, and a tail oil fraction after the fractionating. Specifically, the second hydrocracking reaction unit is used for receiving hydrogen gas, a diesel oil fraction from the fractionating unit (preferably, it further comprises a heavy diesel oil fraction obtained after separation in the first cutting unit), and obtaining a second hydrocracking material flow after the reaction.

Preferably, the light diesel oil fraction supply unit comprises an inferior diesel oil supply unit and a first cutting unit connected in series, the first cutting unit is provided with a light diesel oil fraction outlet and a heavy diesel oil fraction outlet, the light diesel oil fraction outlet is connected with an inlet of the first hydrocracking reaction unit for providing a light diesel oil fraction to the first hydrocracking reaction unit. Specifically, the first cutting unit is used for receiving, cutting, and separating the inferior diesel oil (preferably, a hydrogenated diesel oil obtained after a reaction in the hydrofining reaction unit) from the inferior diesel oil supply unit, and a light diesel oil fraction and a heavy diesel oil fraction are obtained after the separation.

Preferably, the light diesel oil fraction supply unit further includes a hydrofining reaction unit disposed between the inferior diesel oil supply unit and the first cutting unit, and an inlet of the hydrofining reaction unit is connected with an outlet of the inferior diesel oil supply unit to hydrofining the inferior diesel oil provided by the inferior diesel oil supply unit. Specifically, the hydrofining reaction unit is used for receiving an inferior diesel oil and hydrogen gas, performing the desulfurization, denitrification, and aromatic hydrocarbon saturation reaction, and obtaining a hydrogenated diesel oil after the reaction.

In the preferred embodiment, both the light diesel oil fraction obtained by hydrofining and cutting the inferior diesel oil and the wax oil raw material following the hydrogenation pretreatment are introduced into the first hydrocracking reaction unit for performing a first hydrocracking reaction, it not only provides a solution for solving the problem of inferior diesel oil, but also greatly increases the concentration of light diesel oil fraction in the first hydrocracking reaction unit, inhibits the conversion of the heavy fraction to the light diesel oil fraction, improves the yield of tail oil, and promotes that the light diesel oil fraction is efficiently converted to the light naphtha and heavy naphtha.

According to a preferred embodiment of the present invention, a heavy diesel oil fraction outlet of the first cutting unit is connected with an inlet of the second hydrocracking reaction unit, so that the heavy diesel oil fraction and the diesel oil fraction obtained by the fractionating unit jointly perform the second hydrocracking reaction in the second hydrocracking reaction unit. In the preferred embodiment, the second hydrocracking reaction unit is used for receiving hydrogen gas, a diesel oil fraction from the fractionating unit, and a heavy diesel oil fraction obtained from a first cutting unit after separation, and a second hydrocracking material flow is obtained after the reaction.

According to a preferred embodiment of the present invention, an outlet of the second hydrocracking reaction unit is connected with an inlet of the gas-liquid separation unit, so that a second hydrocracking material flow obtained by the second hydrocracking reaction unit and the first hydrocracking material flow jointly perform a gas-liquid separation in the gas-liquid separation unit.

According to a preferred embodiment of the present invention, the system further comprises a purification unit, an inlet of the purification unit connects with the gas-phase material flow outlet of the gas-liquid separation unit for purifying the gas-phase material flow to obtain the purified hydrogen gas. Specifically, the purification unit is used for receiving a gas-phase material flow from the gas-liquid separation unit, and the purified hydrogen is obtained after the purification treatment. The purification unit generally comprises a device for removing hydrogen sulfide in the gas-phase material flow, the specific purification unit may be any one of the existing devices for removing hydrogen sulfide.

Preferably, the outlet of the purification unit is connected with the hydrogen inlet of at least one of the hydrocracking pretreatment reaction units, the first hydrocracking reaction unit, and the second hydrocracking reaction unit, in order to provide purified hydrogen gas to at least one of the hydrocracking pretreatment reaction unit, the first hydrocracking reaction unit and the second hydrocracking reaction unit. The outlet of the purification unit can also be connected with an inlet of the hydrofining reaction unit for providing the hydrogen gas required by the hydrofining reaction.

Preferably, a recycle hydrogen compressor is provided at the outlet of the purification unit. The purified hydrogen gas is compressed by the recycle hydrogen compressor and can enter the hydrofining reaction unit, the hydrocracking pretreatment reaction unit, the first hydrocracking reaction unit, and the second hydrocracking reaction unit for use.

According to a preferred embodiment of the present invention, the system further comprises a second cutting unit connected with an outlet of the second hydrocracking reaction unit for cutting a second hydrocracking material flow obtained by the second hydrocracking reaction unit, the second cutting unit is provided with a light cycle oil outlet and a heavy cycle oil outlet. Specifically, the second cutting unit is used for receiving a second hydrocracking material flow obtained after a reaction in the second hydrocracking reaction unit, a light cycle oil, and a heavy cycle oil are obtained after the separation.

Preferably, the light cycle oil outlet is connected with an inlet of the gas-liquid separation unit, such that the light cycle oil obtained by the second cutting unit and the first hydrocracking material flow jointly subject to a gas-liquid separation in the gas-liquid separation unit. The light cycle oil is connected with a gas-liquid separation unit inlet through a pipeline and is subjected to a gas-liquid separation together with a first hydrocracking material flow of a first hydrocracking reaction unit.

Preferably, the heavy cycle oil outlet is connected with an inlet of the hydrocracking pretreatment reaction unit. The heavy cycle oil is connected with the hydrocracking pretreatment unit through a pipeline, and further preferably enters the reactor through a feed inlet at the middle and lower part of a reactor shell in the hydrocracking pretreatment reaction unit, wherein the volume of the reactor at the lower part of the feed inlet accounts for 10-80%, preferably 12-20% of the total volume of the reactor. A down-flow type raw material is taken as an example, following the flow direction of the liquid-phase material flow, the wax oil raw material enters the reactor through the feed inlet at the top of said reactor, and the heavy cycle oil enters the reactor via the feed inlet at the middle and lower part of the reactor shell.

The present invention is not particularly limited to the specific layout of the respective reaction unit. Preferably, the hydrofining reaction unit is provided with at least one hydrogenation reactor, and the hydrogenation reactor may be any one selected from the group consisting of a fixed bed reactor, an ebullated bed reactor, and a fluidized bed reactor, and preferably a fixed bed reactor.

Preferably, the hydrocracking reaction unit is provided with at least one hydrocracking reactor, and the hydrocracking reactor may be any one selected from the group consisting of a fixed bed reactor, an ebullated bed reactor, and a fluidized bed reactor, and preferably a fixed bed reactor.

Preferably, the first hydrocracking reaction unit is provided with at least one hydrocracking reactor, and the hydrocracking reactor may be any one selected from the group consisting of a fixed bed reactor, an ebullated bed reactor, and a fluidized bed reactor, and preferably a fixed bed reactor.

Preferably, the second hydrocracking reaction unit is provided with at least one hydrocracking reactor, and the hydrocracking reactor may be any one selected from the group consisting of a fixed bed reactor, an ebullated bed reactor, and a fluidized bed reactor, and preferably a fixed bed reactor.

In the present invention, the fractionating unit, the first cutting unit, and the second cutting unit may be various devices conventionally used in the art, as long as each of the above-described objects can be achieved. Preferably, a device having a function of separating the liquid-phase material flow according to the different distillation ranges (e.g., a fractionating column) may be used.

Preferably, the fractionating unit is provided with a gas outlet, a naphtha fraction outlet, a diesel oil fraction outlet, and a tail oil fraction outlet.

The system provided according to the present invention does not impose a specific limitation to the specific device of the gas-liquid separation unit, for example, the gas-liquid separation unit generally comprises at least one of a hot high-pressure separator, a hot low-pressure separator, a cold high-pressure separator and a cold low-pressure separator according to the actual condition. The connection mode between the separators and the connection mode between the separator and the fractional tower may be the existing connection modes in the art, both can be freely selected by those skilled in the art according to the practical requirements.

According to a particularly preferred embodiment of the present invention, a combined hydrogenation system for producing chemical raw materials comprises the following components:

- a hydrofining reaction unit for receiving an inferior diesel oil raw material and hydrogen gas, performing the desulfurization, denitrification, and aromatic hydrocarbon saturation reaction, so that a hydrogenated diesel oil is obtained after the reaction;
- a first cutting unit for receiving, cutting, and separating the hydrogenated diesel oil obtained from the hydrofining reaction unit after the reaction, such that a light diesel oil fraction and a heavy diesel oil fraction are obtained after the separation;
- a hydrocracking pretreatment reaction unit for receiving the wax oil raw material and hydrogen gas, so that a hydrogenated wax oil is obtained after the reaction;
- a first hydrocracking reaction unit is used for receiving hydrogen gas, a hydrogenated wax oil obtained from the hydrocracking pretreatment reaction unit after the reaction, and a light diesel oil fraction from the first cutting unit after the separation process, such that a first hydrocracking material flow is obtained after the reaction;
- a gas-liquid separation unit for receiving and separating a first hydrocracking material flow from a first hydrocracking reaction unit, so that a gas-phase material flow and a liquid-phase material flow are obtained after the gas-liquid separation;
- a fractionating unit for receiving, fractionating, and processing a liquid-phase material flow from the gas-liquid separation unit, such that a gas, a naphtha fraction, a diesel fraction, and a tail oil fraction are obtained after the separation;
- a second hydrocracking reaction unit for receiving hydrogen gas, a diesel oil fraction from the second separation unit, and a heavy diesel oil fraction from the first cutting unit after the separation, so that a second hydrocracking material flow is obtained after the reaction, the second hydrocracking material flow is recycled back to the gas-liquid separation unit for treatment.

FIG. 1 below further illustrates a specific embodiment of the process and system provided by the present invention, as shown in FIG. 1, the combined hydrogenation process for producing chemical raw materials provided by the present invention is as follows: under the condition with the presence of a new hydrogen 10, an inferior diesel oil 1 enters a hydrofining reaction unit 2 to perform a reaction, a hydrogenated diesel oil 3 is obtained after completion of the reaction, and the hydrogenated diesel oil 3 further enters a first cutting unit 23 and subjects to the fractionating process to obtain a light diesel oil fraction 24 and a heavy diesel oil fraction 25; the wax oil raw material 4 and the new hydrogen 10 feed into a hydrocracking pretreatment reaction unit 5 from a feed inlet at the top for performing reaction, a hydrogenated wax oil 6 is obtained after the reaction. In the presence of the new hydrogen 12, a hydrogenated wax oil 6 and a light diesel oil fraction 24 are mixed to form a mixture, which enters a first hydrocracking reaction unit 12 for carrying out a reaction, the obtained first hydrocracking material flow 13 enters a gas-liquid separation unit 7 for carrying out a gas-liquid separation to obtain a gas-phase material flow 8 and a liquid-phase material flow 11, wherein the liquid-phase material flow 11 enters a fractionating unit 14 for performing a separation to obtain a gas 15, a naphtha fraction 16, a diesel oil fraction 17 and a tail oil fraction 26;

wherein a diesel oil fraction 17 and a heavy diesel oil fraction 25 are blended and enter a second hydrocracking reaction unit 18 for carrying out a reaction, and the obtained second hydrocracking material flow 19 can be recycled back to the gas-liquid braking unit 7 and subjects to treatment along with the first hydrocracking material flow 13, or the second hydrocracking material flow 19 enters a second cutting unit 20 and obtains a light cycle oil 21 and a heavy cycle oil 22 after the separation; wherein the light cycle oil 21 and the first hydrocracking material flow 13 are processed jointly, the heavy cycle oil 22 is recycled back to the hydrocracking pretreatment reaction unit 5 for subjecting to the treatment, and further preferably, enters the reactor through a feed inlet at the middle and lower part of a reactor shell in the hydrocracking pretreatment reaction unit 5, the volume of the reactor at the lower part of the feed inlet accounts for 10-80%, preferably 12-20% of the total volume of the reactor. A down-flow type raw material is taken as an example, following the flow direction of the liquid-phase material flow, the wax oil raw material enters the reactor through the feed inlet at the top of said reactor, and the heavy cycle oil enters the reactor via the feed inlet at the middle and lower part of the reactor shell.

The solution and effect of the present invention are further described below with reference to the examples.

In the following examples and comparative examples, each of the hydrofining reaction unit, the hydrocracking pretreatment reaction unit, the first hydrocracking reaction unit, and the second hydrocracking reaction unit were provided with a reactor.

The main properties of the wax oil raw material and the inferior diesel oil used herein were listed in Table 1.

TABLE 1

| Items | Inferior diesel oil raw material | Wax oil raw material |
|---|---|---|
| Density (20° C.), kg/m$^3$ | 916.2 | 929.0 |
| Nitrogen content, mg/kg | 1789 | 2098 |
| Sulfur content, mg/kg | 4589 | 15600 |
| Distillation range, ° C. | 210-358 | 360-522 |
| Condensation point, ° C. | −0 | 21 |
| Content of aromatic hydrocarbons, wt % | 70.2 | 37.8 |

Example 1

The properties of the processed inferior diesel oil and wax oil raw material were illustrated in Table 1. As shown in FIG. 1, under the condition with the presence of a new hydrogen 10, an inferior diesel oil 1 entered a hydrofining reaction unit 2 loaded with a FHUDS-8 diesel oil hydrofining catalyst and an FF-66 diesel oil hydrofining catalyst in a grading manner to perform a reaction, the FHUDS-8 diesel oil hydrofining catalyst and the FF-66 diesel oil hydrofining catalyst were sequentially loaded according to the flow direction of a liquid-phase material, the mass ratio of the FHUDS-8 diesel oil hydrofining catalyst to the FF-66 diesel oil hydrofining catalyst was 25:75, the process conditions were as follows: the reaction pressure was 12.0 MPa, the reaction temperature was 390° C., the volume space velocity was 0.7 h$^{-1}$, the volume ratio of hydrogen/oil was 1,600, the hydrogenated diesel oil 3 was obtained after completion of the reaction, the hydrogenated diesel oil 3 further entered a first cutting unit 23 for subjecting to fractionation to obtain a light diesel oil fraction 24 and a heavy diesel oil fraction 25, and the cutting temperature of the light diesel oil fraction 24 and the heavy diesel oil fraction 25 was 340° C.

The wax oil raw material 4 and the new hydrogen 10 were mixed and entered into a hydrocracking pretreatment reaction unit 5 which was loaded with a FF-34 pretreatment catalyst and an FF-66 pretreatment catalyst in a grading manner, the FF-34 pretreatment catalyst and the FF-66 pretreatment catalyst were sequentially filled according to the flow direction of the liquid-phase material, wherein the mass ratio of the FF-34 pretreatment catalyst to the FF-66 pretreatment catalyst was 12:88; the heavy cycle oil 22 entered into the hydrocracking pretreatment reaction unit 5 through a feed inlet at the middle and lower part of the hydrocracking pretreatment reaction unit 5, the volume of the reactor at the lower part of the feed inlet accounted for 12% of the total volume of the reactor, and the reaction conditions were as follows: the reaction pressure was 12.0 MPa, the reaction temperature was 340° C., the volume space velocity was 2.5 h$^{-1}$, the volume ratio of hydrogen/oil was 1,200, and the hydrogenated wax oil 6 was obtained after the reaction.

In the presence of a new hydrogen 12, the hydrogenated wax oil 6 and the light diesel oil fraction 24 were mixed and entered into a first hydrocracking reaction unit 12 filled with the FC-32A hydrocracking catalyst to perform a reaction to obtain a first hydrocracking material flow 13, wherein the mass ratio of the hydrogenated wax oil to the light diesel oil fraction was 18:1, the reaction conditions were as follows: the reaction pressure was 17.0 MPa, the volume space velocity was 1.2 h$^{-1}$, and the volume ratio of hydrogen/oil was 1,200; the first hydrocracking material flow 13 entered a gas-liquid separation unit 7 to perform a gas-liquid separation (50° C., 13.5 MPa), a gas-phase material flow 8 and a liquid-phase material flow 11 were subsequently obtained, wherein the liquid-phase material flow 11 entered a fractionating unit 14 and separated to obtain a gas 15 (with the distillation range less than 25° C.), a naphtha fraction 16 (with the distillation range of 26-166° C.), a diesel oil fraction 17 (with the distillation range of 167-340° C.), and a tail oil fraction 26 (with the distillation range of 341-518° C.).

A diesel oil fraction 17 and a heavy diesel oil fraction 25 were mixed and entered into a second hydrocracking reaction unit 18 filled with an FC-14 hydrocracking catalyst for carrying out a reaction, wherein the mass ratio of the diesel oil fraction 17 to the heavy diesel oil fraction 25 was 20:1, a second hydrocracking material flow 19 was obtained, wherein the reaction conditions were as follows: the reaction pressure was 15.0 MPa, the volume space velocity was 1.0 h$^{-1}$, the volume ratio of hydrogen/oil was 1,600, a light cycle oil 21 and a heavy cycle oil 22 were obtained after the second hydrocracking material flow 19 entered a second cutting unit 20 for separation, and the cutting temperature of the light cycle oil and the heavy cycle oil was 120° C.; wherein the light cycle oil 21 was processed together with the first hydrocracking material flow 13, and the heavy cycle oil 22 was recycled back to the hydrocracking pretreatment unit 5 for processing. The first hydrocracking reaction temperature and the second hydrocracking reaction temperature were adjusted so that the yield of the heavy naphtha (with the distillation range of 72-166° C.) was 30%, and the reaction results were shown in Table 2.

Example 2

The properties of the processed inferior diesel oil and wax oil raw material were illustrated in Table 1. As shown in FIG.

1, under the condition with the presence of a new hydrogen 10, an inferior diesel oil 1 entered a hydrofining reaction unit 2 loaded with a FHUDS-6 diesel oil hydrofining catalyst and an FF-46 diesel oil hydrofining catalyst in a grading manner to perform a reaction, the FHUDS-6 diesel oil hydrofining catalyst and the FF-46 diesel oil hydrofining catalyst were sequentially loaded according to the flow direction of a liquid-phase material, the mass ratio of the FHUDS-6 diesel oil hydrofining catalyst to the FF-46 diesel oil hydrofining catalyst was 65:35, the process conditions were as follows: the reaction pressure was 8.0 MPa, the reaction temperature was 350° C., the volume space velocity was 1.2 $h^{-1}$, the volume ratio of hydrogen/oil was 1,200, the hydrogenated diesel oil 3 was obtained after completion of the reaction, the hydrogenated diesel oil 3 further entered a first cutting unit 23 for subjecting to fractionation to obtain a light diesel oil fraction 24 and a heavy diesel oil fraction 25, and the cutting temperature of the light diesel oil fraction 24 and the heavy diesel oil fraction 25 was 300° C.

The wax oil raw material 4 and the new hydrogen 10 were mixed and entered into a hydrocracking pretreatment reaction unit 5 which was loaded with an FF-56 pretreatment catalyst, the heavy cycle oil 22 entered into the hydrocracking pretreatment reaction unit 5 through a feed inlet at the middle and lower part of the hydrocracking pretreatment reaction unit 5, the volume of the reactor at the lower part of the feed inlet accounted for 19% of the total volume of the reactor, and the reaction conditions were as follows: the reaction pressure was 14.0 MPa, the reaction temperature was 360° C., the volume space velocity was 1.5 $h^{-1}$, the volume ratio of hydrogen/oil was 1,800, and the hydrogenated wax oil 6 was obtained after the reaction.

In the presence of a new hydrogen 12, the hydrogenated wax oil 6 and the light diesel oil fraction 24 were mixed and entered into a first hydrocracking reaction unit 12 filled with the FC-60 hydrocracking catalyst to perform a reaction to obtain a first hydrocracking material flow 13, wherein the mass ratio of the hydrogenated wax oil to the light diesel oil fraction was 15:1, the reaction conditions were as follows: the reaction pressure was 15.0 MPa, the volume space velocity was 1.2 $h^{-1}$, and the volume ratio of hydrogen/oil was 1,600; the first hydrocracking material flow 13 entered a gas-liquid separation unit 7 to perform a gas-liquid separation (50° C., 13.5 MPa), a gas-phase material flow 8 and a liquid-phase material flow 11 were subsequently obtained, wherein the liquid-phase material flow 11 entered a fractionating unit 14 and separated to obtain a gas 15 (with the distillation range less than 25° C.), a naphtha fraction 16 (with the distillation range of 26-166° C.), a diesel oil fraction 17 (with the distillation range of 167-340° C.) and a tail oil fraction 26 (with the distillation range of 341-518° C.).

A diesel oil fraction 17 and a heavy diesel oil fraction 25 were mixed and entered into a second hydrocracking reaction unit 18 filled with an FC-24 hydrocracking catalyst for carrying out a reaction, wherein the mass ratio of the diesel oil fraction 17 to the heavy diesel oil fraction 25 was 20:1, a second hydrocracking material flow 19 was obtained, wherein the reaction conditions were as follows: the reaction pressure was 16.0 MPa, the volume space velocity was 1.5 $h^{-1}$, the volume ratio of hydrogen/oil was 1,200, a light cycle oil 21 and a heavy cycle oil 22 were obtained after the second hydrocracking material flow 19 entered a second cutting unit 20 for separation, and the cutting temperature of the light cycle oil and the heavy cycle oil was 180° C.; wherein the light cycle oil 21 was processed together with the first hydrocracking material flow 13, and the heavy cycle oil 22 was recycled back to the hydrocracking pretreatment unit 5 for processing. The first hydrocracking reaction temperature and the second hydrocracking reaction temperature were adjusted so that the yield of the heavy naphtha (with the distillation range of 72-166° C.) was 40%, and the reaction results were shown in Table 2.

Example 3

The properties of the processed inferior diesel oil and wax oil raw material were illustrated in Table 1. As shown in FIG. 1, under the condition with the presence of a new hydrogen 10, an inferior diesel oil 1 entered a hydrofining reaction unit 2 loaded with an FHUDS-8 diesel oil hydrofining catalyst to perform a reaction, the process conditions were as follows: the reaction pressure was 7.0 MPa, the reaction temperature was 365° C., the volume space velocity was 1.3 $h^{-1}$, the volume ratio of hydrogen/oil was 1,300, the hydrogenated diesel oil 3 was obtained after completion of the reaction, the hydrogenated diesel oil 3 further entered a first cutting unit 23 for subjecting to fractionation to obtain a light diesel oil fraction 24 and a heavy diesel oil fraction 25, and the cutting temperature of the light diesel oil fraction 24 and the heavy diesel oil fraction 25 was 320° C.

The wax oil raw material 4 and the new hydrogen 10 were mixed and entered into a hydrocracking pretreatment reaction unit 5 which was loaded with a FF-56 pretreatment catalyst and an FTX pretreatment catalyst in a grading manner, the FF-56 pretreatment catalyst and the FTX pretreatment catalyst were sequentially filled according to the flow direction of the liquid-phase material, wherein the mass ratio of the FF-56 pretreatment catalyst to the FTX pretreatment catalyst was 75:25; the heavy cycle oil 22 entered into the hydrocracking pretreatment reaction unit 5 through a feed inlet at the middle and lower part of the hydrocracking pretreatment reaction unit 5, the volume of the reactor at the lower part of the feed inlet accounted for 19% of the total volume of the reactor, and the reaction conditions were as follows: the reaction pressure was 13.0 MPa, the reaction temperature was 355° C., the volume space velocity was 1.3 $h^{-1}$, the volume ratio of hydrogen/oil was 1,300, and the hydrogenated wax oil 6 was obtained after the reaction.

In the presence of new hydrogen 12, the hydrogenated wax oil 6 and light diesel oil fraction 24 were mixed and entered into a first hydrocracking reactor filled with a self-made hydrocracking catalyst to perform a reaction, wherein the mass ratio of the hydrogenated wax oil to the light diesel oil fraction was 20:1, the pore volume of the self-made hydrocracking catalyst was 0.32 mL/g, the carrier was alumina, the loading amounts of the Ni metal oxide and the Co metal oxide were 2.8 wt % and 19.2 wt % of the carrier mass respectively (the total loading amount of metal was 22.0 wt %), and the content of β molecular sieve was 12 wt % of the carrier mass. The reaction pressure was 12.0 MPa, the volume space velocity was 1.2 $h^{-1}$, the volume ratio of hydrogen/oil was 1,300, and the first hydrocracking material flow 13 was obtained through the reaction; the first hydrocracking material flow 13 entered a gas-liquid separation unit 7 to perform a gas-liquid separation (50° C., 13.5 MPa), a gas-phase material flow 8 and a liquid-phase material flow 11 were subsequently obtained, wherein the liquid-phase material flow 11 entered a fractionating unit 14 and separated to obtain a gas 15 (with the distillation range less than 25° C.), a naphtha fraction 16 (with the distillation range of 26-166° C.), a diesel oil fraction 17 (with the distillation range of 167-340° C.), and a tail oil fraction 26 (with the distillation range of 341-518° C.).

A diesel oil fraction 17 and a heavy diesel oil fraction 25 were mixed and entered into a second hydrocracking reaction unit 18 filled with a self-made hydrocracking catalyst for carrying out a reaction, wherein the mass ratio of the diesel oil fraction 17 to the heavy diesel oil fraction 25 was 22:1, a second hydrocracking material flow 19 was obtained, wherein the pore volume of the self-made hydrocracking catalyst was 0.26 mL/g, the carrier was alumina, the loading amounts of the Ni metal oxide and the Co metal oxide were 2.8 wt % and 21.2 wt % of the carrier mass respectively (the total loading amount of metal was 24.0 wt %), and the content of 0 molecular sieve was 15 wt % of the carrier mass; the reaction conditions were as follows: the reaction pressure was 13.0 MPa, the volume space velocity was 1.3 $h^{-1}$, the volume ratio of hydrogen/oil was 1,300, a light cycle oil 21 and a heavy cycle oil 22 were obtained after the second hydrocracking material flow 19 entered a second cutting unit 20 for separation, and the cutting temperature of the light cycle oil and the heavy cycle oil was 150° C.; wherein the light cycle oil 21 was processed together with first hydrocracking material flow 13, and the heavy cycle oil 22 was recycled back to the hydrocracking pretreatment unit 5 for processing. The first hydrocracking reaction temperature and the second hydrocracking reaction temperature were adjusted so that the yield of the heavy naphtha (with the distillation range of 72-166° C.) was 50%, and the reaction results were shown in Table 2.

Example 4

A combined hydrogenation process flow for producing chemical raw materials shown in FIG. 1 was adopted, wherein the heavy cycle oil and the wax oil raw materials jointly entered the hydrocracking pretreatment unit through a feed inlet at the top of the hydrocracking pretreatment unit, the properties of the processed diesel oil having a high content of aromatic hydrocarbons and wax oil raw material were illustrated in Table 1.

Under the condition with the presence of a new hydrogen 10, an inferior diesel oil 1 entered a hydrofining reaction unit 2 loaded with an FHUDS-8 diesel oil hydrofining catalyst to perform a reaction, the process conditions were as follows: the reaction pressure was 7.0 MPa, the reaction temperature was 365° C., the volume space velocity was 1.3 $h^{-1}$, the volume ratio of hydrogen/oil was 1,300, the hydrogenated diesel oil 3 was obtained after completion of the reaction, the hydrogenated diesel oil 3 further entered a first cutting unit 23 for subjecting to fractionation to obtain a light diesel oil fraction 24 and a heavy diesel oil fraction 25, and the cutting temperature of the light diesel oil fraction 24 and the heavy diesel oil fraction 25 was 320° C.

The wax oil raw material 4 and the new hydrogen 10 were mixed and entered into a hydrocracking pretreatment reaction unit 5 which was loaded with an FF-56 pretreatment catalyst and an FTX pretreatment catalyst in a grading manner, the FF-56 pretreatment catalyst and the FTX pretreatment catalyst were sequentially filled according to the flow direction of the liquid-phase material, wherein the mass ratio of the FF-56 pretreatment catalyst to the FTX pretreatment catalyst was 75:25; the reaction conditions were as follows: the reaction pressure was 13.0 MPa, the reaction temperature was 355° C., the volume space velocity was 1.3 $h^{-1}$, the volume ratio of hydrogen/oil was 1,300, and the hydrogenated wax oil 6 was obtained after the reaction.

In the presence of new hydrogen 12, the hydrogenated wax oil 6 and light diesel oil fraction 24 were mixed and entered into a first hydrocracking reactor filled with a self-made hydrocracking catalyst to perform a reaction, wherein the mass ratio of the hydrogenated wax oil to the light diesel oil fraction was 19:1, the self-made hydrocracking catalyst was same as the catalyst filled in the first hydrocracking reactor in Example 3. The reaction pressure was 12.0 MPa, the volume space velocity was 1.2 $h^{-1}$, the volume ratio of hydrogen/oil was 1,300, and the first hydrocracking material flow 13 was obtained through the reaction; the first hydrocracking material flow 13 entered a gas-liquid separation unit 7 to perform a gas-liquid separation (50° C., 13.5 MPa), a gas-phase material flow 8 and a liquid-phase material flow 11 were subsequently obtained, wherein the liquid-phase material flow 11 entered a fractionating unit 14 and separated to obtain a gas 15 (with the distillation range less than 25° C.), a naphtha fraction 16 (with the distillation range of 26-166° C.), a diesel oil fraction 17 (with the distillation range of 167-340° C.), and a tail oil fraction 26 (with the distillation range of 341-518° C.).

A diesel oil fraction 17 and a heavy diesel oil fraction 25 were mixed and entered into a second hydrocracking reaction unit 18 filled with a self-made hydrocracking catalyst (which was same as the catalyst filled in the first hydrocracking reactor in Example 3) for carrying out a reaction, wherein the mass ratio of the diesel oil fraction 17 to the heavy diesel oil fraction 25 was 20:1, a second hydrocracking material flow 19 was obtained, the reaction conditions were as follows: the reaction pressure was 13.0 MPa, the volume space velocity was 1.3 $h^{-1}$, the volume ratio of hydrogen/oil was 1,300, a light cycle oil 21 and a heavy cycle oil 22 were obtained after the second hydrocracking material flow 19 entered a second cutting unit 20 for separation, and the cutting temperature of the light cycle oil and the heavy cycle oil was 150° C.; wherein the light cycle oil 21 was processed together with first hydrocracking material flow 13, and the heavy cycle oil 22 was recycled back to the hydrocracking pretreatment unit 5 for processing. The first hydrocracking reaction temperature and the second hydrocracking reaction temperature were adjusted so that the yield of the heavy naphtha (with the distillation range of 72-166° C.) was 50%, and the reaction results were shown in Table 2.

Example 5

A combined hydrogenation process flow for producing chemical raw materials shown in FIG. 1 was adopted, wherein the second hydrocracking material flow was not subjected to cutting for obtaining the light fraction and heavy fraction, but directly recycled to the gas-liquid separation unit, the properties of the processed diesel oil having a high content of aromatic hydrocarbons and wax oil raw material were illustrated in Table 1.

Under the condition with the presence of a new hydrogen 10, an inferior diesel oil 1 entered a hydrofining reaction unit 2 loaded with an FHUDS-8 diesel oil hydrofining catalyst to perform a reaction, the process conditions were as follows: the reaction pressure was 7.0 MPa, the reaction temperature was 365° C., the volume space velocity was 1.3 $h^{-1}$, the volume ratio of hydrogen/oil was 1,300, the hydrogenated diesel oil 3 was obtained after completion of the reaction, the hydrogenated diesel oil 3 further entered a first cutting unit 23 for subjecting to fractionation to obtain a light diesel oil fraction 24 and a heavy diesel oil fraction 25, and the cutting temperature of the light diesel oil fraction 24 and the heavy diesel oil fraction 25 was 320° C.

The wax oil raw material 4 and the new hydrogen 10 were mixed and entered into a hydrocracking pretreatment reaction unit 5 which was loaded with an FF-56 pretreatment catalyst and an FTX pretreatment catalyst in a grading manner, the FF-56 pretreatment catalyst and the FTX pretreatment catalyst were sequentially filled according to the flow direction of the liquid-phase material, wherein the mass ratio of the FF-56 pretreatment catalyst to the FTX pretreatment catalyst was 75:25; the reaction conditions were as follows: the reaction pressure was 13.0 MPa, the reaction temperature was 355° C., the volume space velocity was 1.3 $h^{-1}$, the volume ratio of hydrogen/oil was 1,300, and the hydrogenated wax oil 6 was obtained after the reaction.

In the presence of new hydrogen 12, the hydrogenated wax oil 6 and light diesel oil fraction 24 were mixed and entered a first hydrocracking reactor filled with a self-made hydrocracking catalyst to perform a reaction, wherein the mass ratio of the hydrogenated wax oil to the light diesel oil fraction was 15:1, the self-made hydrocracking catalyst was same as the catalyst filled in the first hydrocracking reactor in Example 3. The reaction pressure was 12.0 MPa, the volume space velocity was 1.2 $h^{-1}$, the volume ratio of hydrogen/oil was 1,300, and the first hydrocracking material flow 13 was obtained through the reaction; the first hydrocracking material flow 13 entered a gas-liquid separation unit 7 to perform a gas-liquid separation (50° C., 13.5 MPa), a gas-phase material flow 8 and a liquid-phase material flow 11 were subsequently obtained, wherein the liquid-phase material flow 11 entered a fractionating unit 14 and separated to obtain a gas 15 (with the distillation range less than 25° C.), a naphtha fraction 16 (with the distillation range of 26-166° C.), a diesel oil fraction 17 (with the distillation range of 167-340° C.), and a tail oil fraction 26 (with the distillation range of 341-518° C.).

A diesel oil fraction 17 and a heavy diesel oil fraction 25 were mixed and entered into a second hydrocracking reaction unit 18 filled with a self-made hydrocracking catalyst (which was same as the catalyst filled in the first hydrocracking reactor in Example 3) for carrying out a reaction, wherein the mass ratio of the diesel oil fraction 17 to the heavy diesel oil fraction 25 was 25:1, a second hydrocracking material flow 19 was obtained, the reaction conditions were as follows: the reaction pressure was 13.0 MPa, the volume space velocity was 1.3 $h^{-1}$, the volume ratio of hydrogen/oil was 1,300, and second hydrocracking material flow 19 was recycled back to the gas-liquid separation unit 7. The first hydrocracking reaction temperature and the second hydrocracking reaction temperature were adjusted so that the yield of the heavy naphtha (with the distillation range of 72-166° C.) was 50%, and the reaction results were shown in Table 2.

Example 6

Light diesel oil fraction was introduced from another source into the two-stage hydrocracking unit. The light diesel oil fraction had a distillation range of 200-340° C., a density (20° C.) of 856 kg/$m^3$, a nitrogen content of 53 mg/kg, a sulfur content of 710 mg/kg, a condensation point of −8° C., and the aromatic hydrocarbon content of 27.6 wt %. The wax oil raw material and the new hydrogen were mixed and entered into a hydrocracking pretreatment reaction unit loaded with FF-34 pretreatment catalyst and FF-66 pretreatment catalyst in a grading manner, the FF-34 pretreatment catalyst and the FF-66 pretreatment catalyst were sequentially loaded according to the flow direction of a liquid-phase material, the mass ratio of the FF-34 pretreatment catalyst and the FF-66 pretreatment catalyst was 12:88, the heavy cycle oil entered into the hydrocracking pretreatment reaction unit through a feed inlet at the middle and lower part of the hydrocracking pretreatment reaction unit, the volume of the reactor at the lower part of the feed inlet accounted for 12% of the total volume of the reactor, and the reaction conditions were as follows: the reaction pressure was 12.0 MPa, the reaction temperature was 340° C., the volume space velocity was 2.5 $h^{-1}$, the volume ratio of hydrogen/oil was 1,200, and the hydrogenated wax oil was obtained after the reaction.

In the presence of a new hydrogen, the hydrogenated wax oil and the light diesel oil fraction (200-340° C.) were mixed and entered into a first hydrocracking reaction unit filled with an FC-32A hydrocracking catalyst to carry out a reaction to obtain a first hydrocracking material flow, wherein the mass ratio of the hydrogenated wax oil to the light diesel oil fraction was 15:1, the reaction conditions were as follows: the reaction pressure was 17.0 MPa, the volume space velocity was 1.2 $h^{-1}$, and the volume ratio of hydrogen/oil was 1,200; the first hydrocracking material flow entered a gas-liquid separation unit to perform a gas-liquid separation (50° C., 13.5 MPa), a gas-phase material flow and a liquid-phase material flow were subsequently obtained, wherein the liquid-phase material flow entered a fractionating unit and separated to obtain a gas (with the distillation range less than 25° C.), a naphtha fraction (with the distillation range of 26-166° C.), a diesel oil fraction (with the distillation range of 167-340° C.), and a tail oil fraction (with the distillation range of 341-518° C.).

The diesel oil fraction entered a second hydrocracking reaction unit filled with FC-14 hydrocracking catalyst for carrying out a reaction to obtain a second hydrocracking material flow, the reaction conditions were as follows: the reaction pressure was 15.0 MPa, the volume space velocity was 1.0 $h^{-1}$, the volume ratio of hydrogen/oil was 1,600; a light cycle oil and a heavy cycle oil 22 were obtained after the second hydrocracking material flow entered a second cutting unit for separation, and the cutting temperature of the light cycle oil and the heavy cycle oil was 120° C.; wherein the light cycle oil was processed together with first hydrocracking material flow, and the heavy cycle oil was recycled back to the hydrocracking pretreatment unit for processing. The first hydrocracking reaction temperature and the second hydrocracking reaction temperature were adjusted so that the yield of the heavy naphtha (with the distillation range of 72-166° C.) was 30%, and the reaction results were shown in Table 2.

Comparative Example 1

A combined hydrogenation process flow for producing chemical raw materials shown in FIG. 2 was adopted, the properties of the processed diesel oil having a high content of aromatic hydrocarbons and wax oil raw material were illustrated in Table 1. The hydrocracking of wax oil and the hydrofining of diesel oil were independently implemented according to the conventional process in the art, the specific process was follows: the diesel oil raw material 27 and new hydrogen 15 entered a diesel oil hydrofining reactor 17 to perform a reaction, the diesel oil hydrofining reactor 17 was sequentially filled with the FHUDS-8 diesel hydrofining catalyst and FF-66 diesel hydrofining catalyst along the flow direction of a liquid-phase material, the mass ratio of the FHUDS-8 diesel hydrofining catalyst to the FF-66 diesel hydrofining catalyst was 25:75, the reaction conditions included: the reaction pressure was 12.0 MPa, the reaction temperature was 390° C., the volume space velocity was 0.7 $h^{-1}$, the volume ratio of hydrogen/oil was 1,600, a diesel oil hydrofining reaction product 18 obtained from the reaction entered a diesel oil gas-liquid separator 19 to perform a separation, so that a gas-phase material flow 25 and a liquid-phase material flow 20 were obtained, wherein the gas-phase material flow 25 was treated and then compressed by a recycle hydrogen compressor 26 to obtain a recycle hydrogen, the recycle hydrogen was further recycled back to a diesel oil hydrofining reactor for use; the liquid-phase material flow 20 was introduced into a diesel oil fractionating tower 21 and separated to obtain a second gaseous product 22 (with the distillation range less than 25° C.), a second naphtha 23 (with the distillation range of 26-166° C.), and refined diesel oil 24 (with the distillation range of 167-340° C.).

The wax oil raw material 1 and new hydrogen 15 entered a hydrocracking pretreatment reaction area 2, the FF-34 pretreatment catalyst and FF-66 pretreatment catalyst were sequentially filled in the hydrocracking pretreatment reaction area according to a flow direction of the liquid-phase material, wherein the mass ratio of the FF-34 pretreatment catalyst to the FF-66 pretreatment catalyst was 12:88; the reaction conditions of the hydrocracking pretreatment reaction area were as follows: the reaction pressure was 12.0 MPa, the reaction temperature was 340° C., the volume space velocity was 2.5 $h^{-1}$, the volume ratio of hydrogen/oil was 1,200, the pretreatment reaction product 3 obtained from the reaction entered a first hydrocracking reaction area 4, and carried out a reaction in the presence of new hydrogen 15, a first hydrocracking reaction product 16 was obtained after completion of said reaction, the first hydrocracking reaction area was filled with an FC-32A hydrocracking catalyst, the reaction conditions of the first hydrocracking reaction area were as follows: the reaction pressure was 17.0 MPa, the volume space velocity was 1.2 $h^{-1}$, the volume ratio of hydrogen/oil was 1,200; the reaction product 16 entered a wax oil gas-liquid separator 5 and subjected to a separation to obtain a gas-phase material 13 and a liquid-phase material 6, wherein the gas-phase material 13 is treated and then compressed by a recycle hydrogen compressor 14 to provide a recycle hydrogen, which can be further recycled back to the hydrocracking pretreatment reaction area 2 for use, and the liquid-phase material 6 was introduced into a wax oil fractionating tower 7 and subjected to separation to obtain a first gas 8 (with the distillation range less than 25° C.), a first naphtha 9 (with the distillation range of 26-166° C., included a light naphtha and a heavy naphtha), a recycle diesel oil 10 (with the distillation range of 167-340° C.), and a tail oil fraction (with the distillation range of 341-518° C.). The recycle diesel oil 10 entered a second hydrocracking reaction area 11 to implement a reaction, wherein the second hydrocracking reaction area 11 was filled with a FC-44 hydrocracking catalyst. The reaction conditions of the second hydrocracking reaction area were as follows: the reaction pressure was 15.0 MPa, the volume space velocity was 1.0 $h^{-1}$, and the volume ratio of hydrogen/oil was 1,600. The second-stage hydrocracking product 12 obtained from the reaction was introduced into the wax oil fractionating tower 7 and subjected to treatment. The first hydrocracking reaction area temperature and the second hydrocracking reaction area temperature were adjusted so that the yield of the heavy naphtha (with the distillation range of 72-166° C.) was 30%, and the reaction results were shown in Table 3.

Comparative Example 2

The combined hydrogenation process for producing chemical raw materials process was performed according to the same process in Comparative Example 1, except that, The diesel oil hydrofining reaction area was sequentially filled with the FHUDS-6 diesel hydrofining catalyst and FF-46 diesel hydrofining catalyst along the flow direction of a liquid-phase material, the mass ratio of the FHUDS-6 diesel hydrofining catalyst to the FF-46 diesel hydrofining catalyst was 65:35, the reaction conditions of the diesel oil hydrofining reaction area included: the reaction pressure was 8.0 MPa, the reaction temperature was 350° C., the volume space velocity was 1.2 $h^{-1}$, the volume ratio of hydrogen/oil was 1,200.

The hydrofining pretreatment reaction reactor was filled with the FF-56 pretreatment catalyst, the first hydrocracking reactor was loaded with the FC-60 hydrocracking catalyst, and the second hydrocracking reactor was filled with the FC-24 hydrocracking catalyst. The reaction conditions of the hydrocracking pretreatment reaction area were as follows: the reaction pressure was 14.0 MPa, the reaction temperature was 360° C., the volume space velocity was 1.5 $h^{-1}$, the volume ratio of hydrogen/oil was 1,800; the reaction conditions of the first hydrocracking reaction area were as follows: the reaction pressure was 15.0 MPa, the volume space velocity was 1.2 $h^{-1}$, the volume ratio of hydrogen/oil was 1,600; the reaction conditions of the second hydrocracking reaction area were as follows: the reaction pressure was 16.0 MPa, the volume space velocity was 1.5 $h^{-1}$, the volume ratio of hydrogen/oil was 1,200. The first hydrocracking reaction area temperature and the second hydrocracking reaction area temperature were modified so that the yield of the heavy naphtha (with the distillation range of 72-166° C.) was 40%, and the reaction results were shown in Table 3.

Comparative Example 3

The combined hydrogenation process for producing chemical raw materials process was performed according to the same process in Comparative Example 1, except that, The diesel oil hydrofining reaction area was filled with the FHUDS-8 diesel oil hydrofining catalyst, and the reaction conditions of the diesel oil hydrofining reaction area were as follows: the reaction pressure was 7.0 MPa, the reaction temperature was 365° C., the volume space velocity was 1.3 $h^{-1}$, the volume ratio of hydrogen/oil was 1,300;

The hydrofining pretreatment reaction area was sequentially filled with the FF-56 pretreatment catalyst and FTX pretreatment catalyst along the flow direction of a liquid-phase material, the mass ratio of the FF-56 pretreatment catalyst to the FTX pretreatment catalyst was 75:25, a first hydrocracking reactor was filled with the self-made hydrocracking catalyst (which was same as the catalyst filled in the first hydrocracking reactor in Example 3), a second hydrocracking reactor was filled with the self-made hydrocracking catalyst (which was same as the catalyst filled in the second hydrocracking reactor in Example 3). The reaction conditions of the hydrocracking pretreatment reaction area were as follows: the reaction pressure was 13.0 MPa, the reaction temperature was 355° C., the volume space velocity was 1.3 $h^{-1}$, the volume ratio of hydrogen/oil was 1,300; the reaction conditions of the first hydrocracking reaction area were as follows: the reaction pressure was 12.0 MPa, the volume space velocity was 1.2 $h^{-1}$, the volume ratio of hydrogen/oil was 1,300; the reaction conditions of the second hydrocracking reaction area were as follows: the reaction pressure was 13.0 MPa, the volume space velocity was 1.3 $h^{-1}$, the volume ratio of hydrogen/oil was 1,300. The first hydrocracking reaction area temperature and the second hydrocracking reaction area temperature were modified so that the yield of the heavy naphtha was 50%, and the reaction results were shown in Table 3.

As shown in Table 2 and Table 3, the calculation formula of chemical hydrogen consumption is as follows: chemical hydrogen consumption=weight of pure hydrogen consumed by the device per hour/the feeding amount of the device per hour. The deactivation rate refers to the rate of temperature rise of the catalyst bed with an increase in the operating time, which is measured through a long-cycle operation test method, the calculation formula is that deactivation rate=(average reaction temperature of one-stage/two-stage hydrocracking when operating for 15,000 hours−average reaction temperature of one-stage/two-stage hydrocracking in the first day of operation)/(624).

TABLE 2

| Items | Example 1 | Example 2 | Example 3 | Example 4 | Example 5 | Example 6 |
|---|---|---|---|---|---|---|
| First hydrocracking reaction temperature, ° C. | 375 | 378 | 380 | 382 | 383 | 376 |
| Second hydrocracking reaction temperature, ° C. | 362 | 365 | 371 | 372 | 375 | 368 |
| Chemical hydrogen consumption, wt % | 3.28 | 3.39 | 3.32 | 3.39 | 3.42 | 2.80 |
| Light naphtha yield, wt % | 10.35 | 13.68 | 15.78 | 16.23 | 16.34 | 9.97 |
| Heavy naphtha yield, wt % | 30.01 | 40.07 | 50.12 | 49.08 | 49.34 | 30.86 |
| Operating for 2,000 h | 29.70 | 38.99 | 49.82 | 48.36 | 48.22 | 30.12 |
| Operating for 8,000 h | 29.02 | 37.98 | 47.09 | 48.01 | 47.92 | 29.87 |
| Operating for 15,000 h | 28.87 | 36.02 | 46.99 | 47.68 | 47.77 | 29.06 |
| Deactivation rate, ° C./d | 0.035 | 0.055 | 0.049 | 0.052 | 0.051 | 0.39 |
| Diesel oil yield, wt % | 0 | 0 | 0 | 0 | 0 | 0 |
| Tail oil yield, wt % | 50.21 | 43.90 | 32.66 | 30.03 | 29.77 | 50.68 |
| Properties of heavy naphtha | | | | | | |
| Potential content of aromatic hydrocarbons, wt % | 58.4 | 56.9 | 57.2 | 56.5 | 55.7 | 58.9 |
| Octane number | 76 | 67 | 72 | 70 | 69 | 78 |
| BMCI value of tail oil | 11.9 | 12.8 | 13.4 | 13.6 | 13.8 | 12.6 |

TABLE 3

| Items | Comparative Example 1 | Comparative Example 2 | Comparative Example 3 |
|---|---|---|---|
| First hydrocracking reaction temperature, ° C. | 380 | 386 | 396 |
| Second hydrocracking reaction temperature, ° C. | 368 | 373 | 388 |
| Chemical hydrogen consumption, wt % | 3.89 | 3.97 | 4.28 |
| Light naphtha yield, wt % | 15.98 | 18.09 | 20.78 |
| Heavy naphtha yield, wt % | 30.08 | 40.12 | 50.25 |
| Operating for 2,000 h | 29.70 | 38.99 | 49.82 |
| Operating for 8,000 h | 26.98 | 33.98 | 43.09 |
| Operating for 15,000 h | 22.79 | 30.98 | 39.08 |
| Deactivation rate, ° C./d | 0.067 | 0.095 | 0.138 |
| Diesel oil yield, wt % | 30.87 | 22.98 | 17.98 |
| Tail oil yield, wt % | 20.34 | 15.98 | 7.98 |
| Properties of heavy naphtha | | | |
| Potential content of aromatic hydrocarbons, wt % | 51.2 | 50.7 | 50.8 |
| Octane number | 65 | 62 | 66 |
| BMCI value of tail oil | 13.2 | 14.1 | 15.8 |

As indicated by the experimental results of the above Examples and Comparative Examples, the two-stage hydrocracking and the combined hydrogenation process of inferior diesel oil with a high content of aromatic hydrocarbons for producing chemical raw materials provided by the present invention ensure that the hydrocracking reaction temperature and the chemical hydrogen consumption are obviously reduced under the same yield of heavy naphthalene, the yields of tail oil products and liquid products are significantly increased, and the activity of the hydrocracking catalyst is stable along with the extension of the operation period. The diesel and gasoline ratio is reduced to zero, and both the potential content of aromatic hydrocarbons in the heavy naphtha and the BMCI value of tail oil are obviously improved, thereby providing the refineries with a remarkable economic benefit.

The invention claimed is:

1. A combined hydrogenation process for producing chemical raw materials, the process comprises the following steps:

(1) performing a hydrogenation pretreatment reaction on a wax oil and hydrogen-containing gas, mixing the resulting hydrogenated wax oil with a light diesel oil fraction, and performing a first hydrocracking reaction to obtain a first hydrocracking material flow;

(2) separating and fractionating the first hydrocracking material flow to obtain a diesel oil fraction; and (3) performing a second hydrocracking reaction on the diesel oil fraction obtained from step (2) to obtain a second hydrocracking material flow, wherein the light diesel oil fraction has an initial boiling point within the range of 150-250° C. and a final distillation point within the range of 280-360° C., the wax oil has a distillation range of 300° C.-600° C., and the diesel oil fraction has a distillation range of 150° C.-350° C.

2. The process according to claim 1, wherein the mass ratio of the hydrogenated wax oil to the light diesel oil fraction is 1-50:1;

and/or, the light diesel oil fraction is obtained by cutting an inferior diesel oil, wherein the inferior diesel oil has a distillation range of 150° C.-420° C. and an aromatic hydrocarbon content of 20 wt %-90 wt %.

3. The process according to claim 2, further comprising subjecting the inferior diesel oil and the hydrogen-containing gas to the desulfurization, denitrification and aromatic hydrocarbon saturation reaction to obtain a hydrogenated diesel oil, and then carrying out the cutting.

4. The process according to claim 3, wherein the desulfurization, denitrification and aromatic hydrocarbon saturation reaction is carried out at 300-410° C. under a pressure of 3-20 MPa, at a volume space velocity is of 0.2-19 $h^{-1}$ and a volume ratio of hydrogen/oil is of 100-2,500.

5. The process according to claim 2, wherein the inferior diesel oil is at least one selected from the group consisting of catalytic cracking diesel oil, coker diesel oil, and heavy aromatic hydrocarbon oil;

and/or, the wax oil is at least one selected from the group consisting of an atmospheric wax oil, a vacuum gas oil, a deep drawing wax oil, and an ebullated bed wax oil;

and/or, the hydrogenation pretreatment reaction in step (1) is carried out at 310-420° C. under a pressure of 6-21 MPa, at a volume space velocity is of 0.2-8.0 $h^{-1}$ and a volume ratio of hydrogen/oil is of 800-1,800;

and/or, the first hydrocracking reaction in step (1) is carried out under a pressure of 7-20 MPa at an average reaction temperature of 320-420° C., a volume space velocity is of 0.1-5 $h^{-1}$ and a volume ratio of hydrogen/oil is of 400-1,800.

6. The process according to claim 1, wherein step (2) comprises carrying out a gas-liquid separation on the first hydrocracking material flow to obtain a gas-phase material flow and a liquid-phase material flow, and fractionating the liquid-phase material flow to obtain a gas, a naphtha fraction, the diesel oil fraction and a tail oil fraction.

7. The process according to claim 2, wherein in step (3), the diesel oil fraction obtained from step (2) is mixed with a heavy diesel oil fraction obtained from cutting the inferior diesel oil fraction, and the second hydrocracking reaction is then performed, wherein the heavy diesel oil fraction has an initial boiling point of 280-360° C. and a final distillation point of 350-400° C.

8. The process according to claim 7, wherein the mass ratio of the diesel oil fraction obtained from step (2) to the heavy diesel oil fraction is 1-30:1.

9. The process according to claim 1, wherein the second hydrocracking reaction is carried out under a pressure of 7-20 MPa at an average reaction temperature of 300-410° C., at a volume space velocity of 0.3-8.0 $h^{-1}$ and a volume ratio of hydrogen/oil of 700-2,100.

10. The process according to claim 1, wherein the second hydrocracking material flow obtained from step (3) is mixed with the first hydrocracking material flow and then the resulting mixture is subjected to separating and fractionating.

11. The process according to claim 1, wherein the method further comprises: cutting the second hydrocracking material flow to obtain a light cycle oil and a heavy cycle oil, the light cycle oil back to step (2) for performing the separating, and the heavy cycle oil back to step (1) for performing the hydrogenation pretreatment reaction, wherein a cutting temperature of the light cycle oil and the heavy cycle oil is within the range of 10-350° C.

12. The process according to claim 11, wherein the heavy cycle oil enters the reactor through a feed inlet at the middle and lower part of a reactor shell adopted by the hydrocracking pretreatment reaction, and the volume of the reactor at the lower part of the feed inlet accounts for 10-80%.

13. The process according to claim 11, wherein a cutting temperature of the light cycle oil and the heavy cycle oil is within the range of 120-200° C.

14. A combined hydrogenation system for producing chemical raw materials, comprising:

a wax oil supply unit, a hydrocracking pretreatment reaction unit, a first hydrocracking reaction unit, a gas-liquid separation unit, a fractionating unit, and a second hydrocracking reaction unit that are sequentially connected, wherein an outlet of the wax oil supply unit connects with an inlet of the hydrocracking pretreatment reaction unit for providing the wax oil to the hydrocracking pretreatment reaction unit, wherein the gas-liquid separation unit is provided with a gas-phase material flow outlet and a liquid-phase material flow outlet, and the liquid-phase material flow outlet of the gas-liquid separation unit is connected with an inlet of the fractionating unit, wherein the fractionating unit is provided with a diesel oil fraction outlet connected with an inlet of the second hydrocracking reaction unit, the system further comprises a light diesel oil fraction supply unit, an outlet of the light diesel oil fraction supply unit connects with an inlet of the first hydrocracking reaction unit for providing a light diesel oil fraction to the first hydrocracking reaction unit, wherein the light diesel oil fraction supply unit comprises an inferior diesel oil supply unit and a first cutting unit connected in series, the first cutting unit is provided with a light diesel oil fraction outlet and a heavy diesel oil fraction outlet, the light diesel oil fraction outlet is connected with an inlet of the first hydrocracking reaction unit for providing a light diesel oil fraction to the first hydrocracking reaction unit.

15. The system according to claim 14, wherein the light diesel oil fraction supply unit further includes a hydrofining reaction unit disposed between the inferior diesel oil supply unit and the first cutting unit, and an inlet of the hydrofining reaction unit is connected with an outlet of the inferior diesel oil supply unit to hydrofining the inferior diesel oil provided by the inferior diesel oil supply unit.

16. The system according to claim 14, wherein a heavy diesel oil fraction outlet of the first cutting unit is connected with an inlet of the second hydrocracking reaction unit so that the heavy diesel oil fraction and the diesel oil fraction obtained by the fractionating unit are mixed before being subjected the second hydrocracking reaction in the second hydrocracking reaction unit;

and/or, the fractionating unit is provided with a gas outlet, a naphtha fraction outlet, a diesel oil fraction outlet, and a tail oil fraction outlet;

and/or, an outlet of the second hydrocracking reaction unit is connected with an inlet of the gas-liquid separation unit so that a second hydrocracking material flow obtained by the second hydrocracking reaction unit and the first hydrocracking material flow are mixed before being subjected to a gas-liquid separation in the gas-liquid separation unit.

17. The system according to claim 14, wherein the system further comprises a second cutting unit connected with an outlet of the second hydrocracking reaction unit for cutting a second hydrocracking material flow obtained by the second hydrocracking reaction unit, the second cutting unit is provided with a light cycle oil outlet and a heavy cycle oil outlet.

18. The system according to claim 17, wherein the light cycle oil outlet is connected with an inlet of the gas-liquid separation unit, such that the light cycle oil obtained by the second cutting unit and the first hydrocracking material flow are mixed before being subjected to a gas-liquid separation in the gas-liquid separation unit.

* * * * *